United States Patent [19]

Carter et al.

[11] Patent Number: 4,907,822
[45] Date of Patent: Mar. 13, 1990

[54] ROUNDING OF HARD COVER BOOKS

[75] Inventors: David G. Carter, Chorleywood; Derek J. Green, Langley; Anthony J. Clark, Thame, all of England

[73] Assignee: National Starch and Chemical Corp., Bridgewater, N.J.

[21] Appl. No.: 249,490

[22] Filed: Sep. 26, 1988

[51] Int. Cl.$^4$ .................. B42D 1/00; B42B 9/06; B42L 5/02

[52] U.S. Cl. .................. 281/15.1; 281/21.1; 281/36; 281/51; 412/8; 412/25; 156/908

[58] Field of Search ............. 156/908; 281/15.1, 51, 281/21.1, 36; 412/8, 25, 1

[56] References Cited

U.S. PATENT DOCUMENTS

| | | | |
|---|---|---|---|
| 3,137,874 | 6/1964 | Hildemann et al. | 11/2 |
| 3,239,478 | 3/1966 | Harlan | 260/27 |
| 3,244,436 | 4/1966 | McKowen | 281/23 |
| 3,573,240 | 3/1971 | Flanagan | 260/23 |
| 3,615,106 | 10/1971 | Flanagan et al. | 281/21 |
| 3,837,994 | 9/1974 | Flanagan et al. | 161/100 |
| 3,931,077 | 1/1976 | Uchigaki | 260/26 |
| 3,964,769 | 6/1976 | Shatzkin | 281/21 R |
| 3,968,089 | 7/1976 | Cuscurida | 260/859 R |
| 4,019,758 | 4/1977 | Heller et al. | 281/21 R |
| 4,091,487 | 5/1978 | Axelrod | 281/21 R |
| 4,184,218 | 1/1980 | Hawkes | 11/1 AD |
| 4,187,572 | 2/1980 | Savich | 11/2 |
| 4,248,657 | 2/1981 | Henry | 156/443 |
| 4,345,349 | 8/1982 | Flanagan | 412/5 |
| 4,374,441 | 2/1983 | Carter et al. | 412/3 |
| 4,405,156 | 9/1983 | Carter et al. | 281/29 |
| 4,420,282 | 12/1983 | Axelrod | 412/4 |
| 4,536,012 | 8/1985 | Hume | 281/21 R |
| 4,615,541 | 10/1986 | Kwauka | 281/29 |
| 4,660,858 | 4/1987 | Flanagan | 281/21 R |
| 4,712,808 | 12/1987 | Beh-Forrest et al. | 281/15 R |
| 4,722,650 | 2/1988 | Allen et al. | 412/3 |
| 4,775,719 | 10/1988 | Markevka et al. | 525/125 |
| 4,808,255 | 2/1989 | Markevka et al. | 156/307.3 |

FOREIGN PATENT DOCUMENTS

| | | |
|---|---|---|
| 19125 | 11/1980 | . |
| 118171 | 9/1984 | European Pat. Off. . |
| 0232055 | 8/1987 | European Pat. Off. . |
| 0246473 | 11/1987 | European Pat. Off. . |
| 711221 | 7/1971 | U.S.S.R. . |
| 926136 | 5/1982 | U.S.S.R. . |
| 996594 | 2/1983 | U.S.S.R. . |
| 1348229 | 10/1987 | U.S.S.R. . |
| 2137638A | 10/1984 | United Kingdom . |
| 87/02624 | 5/1987 | World Int. Prop. O. . |

OTHER PUBLICATIONS

Blair, W. E. et al., "Good Tack and Open Time Help Animal Glue Hold Market Share", Adhesives Age, Jun. 1987.

Klinefelter, L. M., "Bookbinding Made Easy", The Bruce Publishing Company, Milwaukee, pp. 39–41.

Leitner, N. B., "A New Look at Animal Glue for Casemaking", H. B. Fuller Company.

Mielke, G. P., "Book Cover Warping", 8 pages.

Blaise, James, "Bookbinding," Book Production Magazine.

Primary Examiner—Paul A. Bell
Attorney, Agent, or Firm—Ellen T. Dec; Edwin M. Szala

[57] ABSTRACT

Rounded, hard covered books are bound using a specific class of low viscosity reactive urethane hot melt adhesive compositions which provide a coating which will remain sufficiently flexible and thermoplastic so as to be capable of accepting and maintaining the rounded configuration even after extended periods of storage.

19 Claims, No Drawings

ROUNDING OF HARD COVER BOOKS

BACKGROUND OF THE INVENTION

The manufacture of hard covered books involves unique features of construction and operation which are not required in other methods of bookbinding. While the specific steps may vary from one manufacturer to another, or even within the same manufacturer from one type of book to another, certain steps are generally found in all operations. These steps include printing of the pages either in long, continuous sheets or in individual sheets; then cutting, folding and arranging them to form a series of stacks, referred to as signatures which are, in essence, a plurality of sheets. These signatures are collected and then enclosed by means of end papers which are typically adhered to the outer leaves of the first and last signatures. The resulting bookblock may then pass into a unsewn binding machine over a cutting or spine preparation unit, cutting out bolts and folds. Adhesives are then applied to the cut edges of the signatures in a "gluing off" operation which provide greater rigidity to the bookblock so as to enable it to withstand subsequent trimming and handling operations. A crash or other reinforcing stretch material may be added at this point. The bookblock is then trimmed and either cased-in as a flat backed bookblock for subsequent rounding or it is rounded, backed and then cased in.

Although the use of the hot melt adhesive has met with commercial success in the binding of paper backed books, i.e. soft covered books wherein they have served to increase the rate of output to eliminate the stitching and stapling step, and to provide more permanent binding, serious limitations have been encountered when attempts have been made to use hot melts in the binding of sewn hard covered books and even more particularly unsewn hard covered books. These limitations have been especially noted in the critical rounding step of the binding operation, i.e. the step wherein a curvature is impressed on the back edges of the book body and where the rear portions of the outermost signatures are bent into a flange-like projection along each side of the back edge so that the cover boards may be closely fitted to the assembled body of leaves while permitting the hinge portions thereof to have ample freedom of motion without exhibiting any tendency to become torn or pulled out of place.

Some ethylene vinyl acetate based hot melt adhesives have been developed for use in rounding hard cover books, however attempts to utilize polyurethane hot melt adhesives have not been satisfactory either because (1) they provide adhesive films which are too rigid to be impressed into a rounded configuration or which split in the attempt, thereby losing their film continuity and enabling the pages to separate from the bound signatures or, (2) they provide adhesive films which, although forming the desired rounded configuration, exhibit an excessive plastic flow. In the latter instance, the excellent "elastic memory" exhibited by these films causes them to abandon the required rounded configuration and to revert to the configuration which they assumed prior to the rounding operation.

Moreover these prior urethane adhesives are particularly deficient in their ability to be rounded and backed it there are any appreciable periods of time between application of the adhesives and the final rounding operation. Since the hard cover cases and the book blocks are often assembled in two different locations, it is very common in the industry to store the book blocks for several days, or even weeks, after application of the adhesive and prior to rounding of the ultimate hard cover books. In such cases, once the adhesive cures by fully crosslinking, the thermoplastic properties required to adapt to a rounded shape are lost.

Therefore, since the critical rounded configuration is not provided in either instance, it becomes obvious that the currently available urethane based hot melt adhesives which are desirable for their strength properties are not readily applicable for use in the binding of rounded, hard covered books.

SUMMARY OF THE INVENTION

We have now found that the use of a specific class of low viscosity reactive urethane hot melt adhesive compositions for binding roundable sewn or unsewn hard cover books provides a coating which will remain sufficiently flexible and thermoplastic so as to be capable of accepting and maintaining the rounded configuration even after days, or weeks, of storage.

The specific hot melt adhesives for use herein are prepared by the addition of urethane prepolymers to low molecular weight polymers formed from ethylenically unsaturated monomers which do not contain active hydrogen, the adhesives being solid at room temperature and coatable at a viscosity of 3000 to 50,000 cps. at 120° C. without the need for additional tackifiers or plasticizers. Adhesives for use herein are disclosed in copending U.S. patent application Ser. No. 200,092, filed May 27, 1988, the disclosure of which is incorporated herein by reference.

In addition, we have found that the heat resistance of the hot melt adhesives used herein may be even further improved by utilizing an ethylenically unsaturated monomer which contains moisture reactive functional (crosslinking) groups. The resultant hot melt adhesive, upon curing, produces a roundable bookbinder adhesive consisting of a crosslinked polyurethane and a crosslinked ethylenically unsaturated polymer, i.e., a fully interpenetrating network (IPN) adhesive.

In accordance with the general procedure for preparing adhesives suitable for use herein, the low molecular weight polymer may be added to a polyol component prior to reaction with the isocyanate components or it may be added to the already formed prepolymer. Suitable adhesives may also be formed through the simultaneous polymerization of the urethane prepolymer and the ethylenically unsaturated monomers. The polyurethane prepolymer may also be polymerized in the ethylenically unsaturated monomers, which are then subsequently polymerized to form the adhesive. Alternatively if a polyol is used to form the prepolymer, the ethylenically unsaturated monomers may be polymerized in the polyol using free radical polymerization procedures. In this case, the isocyanate components are subsequently polymerized with the mixture using conventional condensation polymerization procedures. This latter polymerization procedure has the advantage of excellent control of the molecular weight of the resulting vinyl polymer (as determined by intrinsic viscosity) and also produces a polymer which is free of detrimental impurities. In addition, the reduction in the handling and inventory of materials and elimination of intermediate packaging and storage bring about significant cost savings.

In the specific embodiment wherein an ethylenically unsaturated monomer containing moisture reactive functional groups is employed, the reactive nature of the crosslinking monomer requires that the monomer be added after the prepolymer has been formed. Thus, in this embodiment, the (co)polymer may be added in its polymerized form to the already formed prepolymer. Alternatively, and more preferably, the monomer or monomers are added to the already formed polyurethane prepolymer and polymerized therein using free radical polymerization procedures.

DETAILED DESCRIPTION OF THE PREFERRED EMBODIMENTS

Any ethylenically unsaturated monomer capable of free radical polymerization and which does not contain active hydrogen may be used herein. Most commonly employed are the $C_1$ to $C_{12}$ esters of acrylic and methacrylic acids including, but not limited to methyl acrylate, ethyl acrylate, n-butyl acrylate, isobutyl acrylate, n-propyl or iso-propyl acrylate as well as the corresponding methacrylates. Mixtures of compatible (meth)acrylate monomers may also be used. Such mixtures, including mixtures of butyl and methyl methacrylate are well known in the art. Additional ethylenically unsaturated monomers such as vinyl esters (e.g., vinyl acetate and vinyl propionate), vinyl ethers, fumarates, maleates, styrene, acrylonitrile, ethylene, vinyl ethers, etc. may be used as may copolymers thereof.

When the ethylenically unsaturated monomer contains moisture reactive functional groups, any such monomer containing moisture reactive (curable) functional groups may be employed. In particular, monomers containing silane or reactive isocyanate functionality are particularly useful herein.

Typical of useful silane or isocyanate containing ethylenically unsaturated copolymers are those which contain only mers derived from an ethylenically unsaturated monomer containing silane or isocyanate functional groups or those which contain up to 99% by weight of mers derived from a non-silane or non-isocyanate containing ethylenically unsaturated monomer capable of free radical polymerization. Thus, the final ethylenically unsaturated silane or isocyanate containing copolymer may contain 1–100% of the polymerized ethylenically unsaturated silane or isocyanate monomer, preferably up to 50% by weight and more preferably (from an economic standpoint) 5–30% by weight. Indeed, levels of ethylenically unsaturated silane or isocyanate containing monomers in the range of 15% or less have been shown to provide potentially commerically significant results.

The ethylenically unsaturated silanes are preferably those which will participate directly in the reaction by free-radical polymerization and which do not contain active hydrogen. Representative commercially available silanes of this type include with vinyltrichlorosilane, vinyltriethoxysilane, vinyltrimethoxysilane, vinyltris(2-methoxyethoxy)silane, 3-methacryloxypropyltrimethoxysilane, 3-methacryloxypropyltris(2-methoxyethoxy)silane, vinyltriacetoxysilane, 4-(3-trimethoxysilylpropyl)benzylstyrene sulfonate, 3-acryloxypropyltrimethoxysilane, allyltriethoxysilane, allyltrimethoxysilane, vinylmethyldiethoxysilane, vinylmethyldiacetoxysilane, 3-methyacryloxypropylmethyldiethoxysilane, 3-acryloxypropyldimethylmethoxysilane, etc.

The ethylenically unsaturated isocyanates are also preferably those which will participate directly in this reaction by free-radical polymerization and which do not contain active hydrogen. Representative commercially available isocyanates of this type include isocyanatoethyl methacrylate and m-isopropenyl-$\alpha,\alpha$-dimethylbenzyl isocyanate.

As discussed above, any ethylenically unsaturated monomer capable of free radical polymerization and which does not contain active hydrogen may be employed as comonomer in forming the final silane or isocyanate containing copolymer. Most commonly employed are the $C_1$ to $C_{12}$ esters of acrylic and methacrylic acids including, but not limited to methyl acrylate, ethyl acrylate, n-butyl acrylate, isobutyl acrylate, n-propyl or iso-propyl acrylate as well as the corresponding methacrylates. Mixtures of compatible (meth)acrylate monmers may also be used. Such mixtures, including mixtures of butyl and methyl methacrylate are well known in the art. Additional ethylenically unsaturated monomers such as vinyl esters (e.g., vinyl acetate and vinyl propionate), vinyl esters, fumarates, maleates, styrene, acrylonitrile, ethylene, vinyl ethers, etc. may be used as may copolymers thereof.

The urethane prepolymers are those conventionally used in the production of polyurethane hot melt adhesive compositions. Most commonly, the prepolymer is prepared by the condensation polymerization of a polyisocyanate with a polyol, most preferably the polymerization of a diisocyanate with a diol. The polyols used include polyhydroxy ethers (substituted or unsubstituted polyalkylene ether glycols or polyhydroxy polyalkylene ethers), polyhydroxy polyesters, the ethylene or propylene oxide adducts of polyols and the monosubstituted esters of glycerol.

In addition, the urethane prepolymers may be prepared by the reaction of a polyisocyanate with a polyamino or a polymercapto-containing compound such as diamino polypropylene glycol or diamino polyethylene glycol or polythioethers such as the condensation products of thiodiglycol either alone or in combination with other glycols such as ethylene glycol, 1,2-propylene glycol or with other polyhydroxy compounds disclosed above. Also, small amounts of low molecular weight dihydroxy, diamino, or amino hydroxy compounds may be used such as saturated and unsaturated glycols e.g. ethylene glycol or condensates thereof such as diethylene glycol, triethylene glycol, and the like; ethylene diamine, hexamethylene diamine and the like; ethanolamine, propanolamine, N-methyldiethanolamine and the like.

Any suitable organic polyisocyanate may be used such as, for example, ethylene diisocyanate, ethylidene diisocyanate, propylene diisocyanate, butylene diisocyanate, hexamethylene diisocyanate, toluene diisocyanate, cyclopentylene-1,3,-diisocyanate, cyclohexylene-1,4-diisocyanate, cyclohexylene-1,2-diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4,4'-diisocyanate, dichlorohexamethylene diisocyanate, furfurylidene diisocyanate, 1-chlorobenzene-2,4-diisocyanate, 4,4',4''-triisocyanatotriphenylmethane, 1,3,5-triisocyanato-benzene, 2,4,6-triisocyanato-toluene, 4,4'-dimethyldiphenylmethane-2,2',5,5-tetraisocyanate, and the like.

The polyisocyanate and polyol, polyamino or polymercapto components are combined in proportions so as to yield a urethane prepolymer characterized by an isocyanate content of from about 0.25 to about 15%, preferably to about 10%, and most preferably from 1.5 to 5%. In addition, the ratio of isocyanate equivalents to hydroxyl, amino or mercapto equivalents (known as the isocyanate index) should be greater than 1 but no more than about 2. By maintaining the low isocyanate index, we are able to reduce the level of free isocyanate content in the final hot melt adhesive composition to less than about 4%, preferably less than 1%. It will be recognized that the presence of higher levels of free isocyanate has a detrimental effect on a hot melt formulation since it causes toxic fumes to be released when the adhesive is heated to application temperature. The higher levels of free isocyanate may also cause reduction in viscosity and poorer initial bond strength of the adhesive. The precise amount of the polyisocyanate used in the polymerization will depend on the equivalent weight and amount of the non-isocyanate components, and the particular polyisocyanate employed. In general, the amount of the polyisocyanate needed to achieve the isocyanate content will vary from about 5 to about 55% of the final prepolymer.

In the broadest sense, the ethylenically unsaturated monomer may be polymerized using conventional free radical polymerization procedures to a relatively low molecular weight. For purposes of clarification herein, by "low molecular weight" we mean weight average molecular weights in the range of approximately 10,000 to 30,000. The low molecular weight is obtained by careful monitoring and controlling the reaction conditions and, generally, by carrying out the reaction in the presence of a chain transfer agent such as dodecyl mercaptan. There is a recognized correlation between intrinsic viscosity and molecular weight and we have found that, in general, monomers polymerized to an intrinsic viscosity of 0.1 to 0.4 (I.V. as measured in a 9:1 mixture of tetrahydrofuran and alcohol) are particularly preferred for use herein. In this embodiment, the low molecular weight polymer is then blended either with the polyol and dissolved therein prior to reaction with the isocyanate component or the low molecular weight polymer is dissolved in the already formed urethane prepolymer. In the case of polyamino or polymercapto containing prepolymers, in-situ vinylic polymerization must be performed only in the pre-formed prepolymer. In either case, low molecular weight polymer is combined with the isocyanate terminated urethane prepolymer in a proportion such that the reactive curing hot melt adhesive contains about 5 to 90% of the urethane prepolymer and 95% to 10% of the low molecular weight polymer. Care should be taken in storing and handling the low molecular weight polymer to avoid contamination with ambient moisture or other factors which might effect the stability of the prepolymer system.

In accordance with an alternate method for preparing the urethane prepolymers, where the ethylenically unsaturated monomers do not contain reactive functional groups, and wherein a polyol is employed, the monomers are combined in an amount of about 2 to 90% by weight with 10 to 98% by weight of the polyol and polymerized therein using conventional free radical polymerization procedures in the presence of a chain transfer agent such as dodecyl mercaptan to achieve the low molecular weight polymer dissolved in the polyol. Subsequent to the polymerization of the ethylenically unsaturated monomer(s), the polyisocyanate and any additional ingredients required for the urethane prepolymer forming reaction are added and that reaction is carried out using conventional condensation polymerization procedures. In this manner, the resultant isocyanate terminated urethane prepolymer forms the reactive curing hot melt adhesive described above which contains about 5 to 90% of the urethan prepolymer and 95 to 10% of the low molecular weight polymer It is also possible in the case of monomers which do not contain isocyanate reactive functional groups to polymerize the low molecular weight polymer in the presence of the already formed isocyanate terminated urethane prepolymer. This method has the drawback of subjecting the prepolymer to unnecessary heating during the acrylic polymerization, heating that might result in branching, viscosity increase, depletion of needed isocyanate groups and possible gellation. Although these disadvantages are subject to control, more stringent control of conditions are required as compared to polymerization in the non-isocyanate functional urethane components. When the reaction is run in the polyol or other non-isocyanate containing component, there is also the advantage of lower reaction viscosities and reduced exposure to isocyanate vapors because of the lesser amount of heating required.

As discussed previously, the resultant hot melt adhesives which are solid at room temperature have appropriate application viscosities within the range of 3000 to 50,000 cps at 120° C. (which corresponds to about 1500 to 25,000 at 135° C. and 10,000 to about 100,000 at 108° C.) and thus require no additional tackifiers and/or plasticizers in order to achieve these application viscosities. It is noted, however, that small amounts of tackifiers or plasticizers may be added so long as their presence does not serve as a detriment to the desired adhesive properties.

The resulting hot melt adhesive compositions, as described hereinabove, are typically applied at temperatures of from about 230° to 250° F. and a corresponding melt viscosity of from about 5000 to 40,000 centipoises. Coatings having a wet film thickness of from about 5 to 30 mils are ordinarily utilized in preparing the rounded, hard covered books by means of the process of this invention.

The basic technique for binding rounded, hard covered books as contemplated herein comprises the steps of: (1) printing, cutting, folding and enclosing the collected signatures by means of end papers; (2) passing the resultant bookblock into a binding machine; (3) applying the specific hot melt adhesive composition to the sewn or cut edges of the signatures in a "gluing off" operation; (4) allowing the adhesive to solidify at ambient temperatures or by means of forced cooling; (5) rounding the bound signatures, i.e. mechanically deforming the backbone, and concurrently the front face, to the shape commonly employed in the manufacture of hard covered books; (6) lining-up the bound sheets, i.e. applying crash or like fabric to a fresly applied hot melt adhesive coating which may or may not be identical to the previously utilized hot melt composition; (7) enclosing the bound sheets in endpapers or interling, if such end-papers have not previously been bound into the book body; and (8) casing-in the bound book within hard covers. As an alternative step, the crash or like material may be applied to the partially solidified hot melting coating at a point which is intermediate, timewise, between steps 3 and 4, as contrasted with its more conventional application at step 6; the use of the latter sequence being dependent upon the particular bookbinding equipment that is being utilized. In either instance, this novel procedure results in the preparation of rugged, durable, hard covered books which are substantially configuration and separation of their bound pages.

While the major thrust of the invention has been directed to the rounding of unsewn books which rely for their integrity on the properties of the adhesive film, the invention is equally applicable for rounding of sewn bookblocks.

This invention can be further illustrated by the following examples of preferred embodiments thereof, although it will be understood that these examples are included merely for purposes of illustration and are not intended to limit the scope of the invention unless otherwise specifically indicated.

EXAMPLE I

The following example illustrates the preparation of an adhesive composition for use herein.

A one liter reaction vessel was set up equipped with a condenser, gas inlet tube, slow addition tube, thermometer, stirrer, and provisions for heating/cooling. The ingredients of the reaction consisted of the following:

| | | |
|---|---|---|
| 1. Polypropylene glycol (1000 mol wt.) | 275.8 gm | |
| 2. 1,6-hexane diol, neopentyl glycol adipate (3000 M.W.) | 88.9 gm | |
| 3. 1,6-hexane diol, neopentyl glycol adipate (1000 M.W.) | 29.3 gm | |
| 4. Butyl methacrylate | 17.8 gm | |
| 5. Butyl methacrylate | 94.1 gm | |
| 6. Methyl methacrylate | 9.4 gm | |
| 7. Methyl methacrylate | 53.6 gm | |
| 8. Dodecyl mercaptan | 0.68 gm | |
| 9. Benzoyl peroxide | 1.7 gm | |
| 10. Benzoyl peroxide | 0.6 gm | |
| 11. Methylene bis phenyl diisocyanate | 131.1 gm | |

The reaction vessel was purged with dry nitrogen and a slow stream of dry nitrogen was bubbled subsurface throughout the reaction. Ingredients designated 1, 2, 3, 4, 6, 8 and 9 were added to the vessel and the temperature raised to 80° C. After ½ hr at 80° C. ingredients 5 and 7 were added uniformly over a period of 1 hr. The reaction was held at 80° C. for an additional three hours, at which time 10 was added. The reaction was held an additional 2 hrs. @ 80° C. and 11 was added; then the temperature was raised to 100° C. and held for three hours. At this point a vacuum of 120 mm to 130 mm was applied to the vessel for 20 minutes to 30 minutes and the reaction poured hot from the flask.

| Properties: | |
|---|---|
| % Methacrylate polymer | 25% |
| Ratio of butyl methacrylate to methyl methacrylate | 64 to 36 |
| % Urethane prepolymer | 75% |
| % isocyanate groups | 1.9% |
| Viscosity at 100° C. | 64,000 cps |
| Viscosity at 120° C. | 25,250 cps |
| Viscosity at RT | Solid |
| Intrinsic Viscosity in tetrahydrofuran/ethanol = 9/1 | 0.18 |
| Color | water white to very slightly amber |
| Clarity | clear to very slightly hazy |
| Calculated urethane prepolymer mol. wt. | 3315 mol. wt. |
| Isocyanate Index | 1.6 |

EXAMPLE II

This example illustrates the addition of a commercially available low molecular weight polymer to the urethane prepolymer to produce a hot melt adhesive Elvacite 2013 is a 64% butylmethacrylate/36% methylmethacrylate copolymer of I.V. 0.2 available from DuPont. The Elvacite was vacuum dried in a desicator for 24 hours immediately prior to use herein.

| Ingredients: | |
|---|---|
| Polypropylene Glycol (2000 Mol. wt.) | 621.0 gm |
| 1,6 hexanediol adipate (3000 Mol. wt.) | 266.5 |
| Elvacite 2013 | 361.0 |
| Methylene bisphenyl diisocyanate | 191.0 |

Procedure

All the ingredients listed above were added to the vessel and heated for 100° C. until the Elvacite was dissolved. After 4 hours at 100° C. the reaction was poured hot from the vessel. The samples had the following properties:

| Properties | |
|---|---|
| % Isocyanate groups | 1.5–2.0% |
| Viscosity at 100° C. | 7000–15000 cps |
| Viscosity at room temp. | Semi-Solid |
| Intrinsic viscosity in THF/ETOH | 0.15–0.25 |
| Color | water white |
| Clarity | slightly hazy |
| Isocyanate Index | 2.0 |

In order to demonstrate the applicability of the hot melt of Example II to book binding operations, it was subjected to the following test procedures:

Low Temperature Flexibility

The molten hot melt was cast, by means of a heated Bird application, onto a polytetrafluoroethylene-coated steel plate yielding a film having a dry film thicknesses of 20 mils. After cooling, the film specimen was stripped from the plate and cut into ½×2 inch test specimens. A representative specimen was then placed in a temperature controlled, carbon dioxide cabinet for a period of 10 minutes whereupon it was immediately flexed at a 180° angle. Where the specimen did not crack as a result of this procedure, a second identical specimen was placed in the cabinet at a lower temperature and the flexing procedure repeated. The temperature at which the specimen eventually cracked was viewed as its "low temperature flexibility" value. Thus, as the latter value is decreased, there is a corresponding increase in the flexibility and stability which can be expected upon exposing these films and the books bound therewith to low temperature conditions. The adhesive of Example II passed at −45° F., a temperature which represents the lowest temperature possible for the equipment utilized.

Tensile Strength

This property was determined on films cast from the hot melts according to Test Method A of ASTM procedure of D 882-56 T utilizing an Instron Tensile Tester; the latter films having been prepared according to the method set forth in the above described "Low Temperature Flexibility" test. The films derived from the hot melt adhesive composition of Example II exhibited a tensile strength of 1700 p.s.i.

Upon coating the above prepared molten hot melt composition onto the sewn edges of compressed signatures as part of a bookbinding process, an adhesive film was quickly formed, which upon setting or cooling, produced an excellent spine binding.

The above described properties of this hot melt composition thus indicate its usefulness in the binding of books.

In order to demonstrate the high degree of permanent set exhibited by the hot melt compositions described herein and, thereby, their applicability for use in bookbinding operations wherein rounding is a critical feature, the composition of Example II was subjected to a test procedure whereby it was cast, by means of a heated Bird applicator, onto a polytetrafluoroethylene-coated steel plate yielding a film having a dry thickness of 20 mils. After cooling, the film was stripped from the plate and cut into ½ by 2 inch test specimens. Each specimen was then elongated to approximately 50% of its original length and, after the stress was relaxed, allowed to reach equilibrium for a period of 24 hours. The specimen was then measured in order to determine the extent to which it had reverted to its original length.

The binding of rounded, hard covered books requires the use of hot melt adhesives exhibiting a low elastic memory and a low Percent Recovery value, i.e. a value of about 25 to 55%, is preferred for such use. The adhesive of Example II had an initial length of 0.5 inches and a final length of 0.625 inches, giving a Percent Recovery of 50%.

The adhesive composition of Examples II was then used to round unsewn books. The books were rounded after aging for 5 weeks by heating in an oven at 130° C. for 12 minutes and hand-formed into a "round" and held until the spine cooled (approx. 30 seconds). The rounded edges stayed in place with no obvious straightening even after a three month period of time. In contrast, similar bookblocks prepared with competitive urethane hot melt adhesive formulations could not be rounded after the five week period. To further test the ability of the adhesive to retain the "round", the books were aged in a 50° C. oven for two weeks. Again, there was no measurable difference in the degree of the round.

Similar results were observed when other bookblocks (both sewn and unsewn) were rounded at temperatures varying from 54° to 110° C.

To illustrate a further benefit of the adhesive described herein, an already rounded book was reheated to 100° C. and it was impossible to remove the round due to the rounded "memory" of the adhesive superior film. In contrast, conventional ethylene vinyl acetate or rubber based thermoplastic hot melt adhesives lost their round upon similar conditions. This test thus provides an accelerated aging test which represents the environmental conditions to which books may be exposed under normal usages.

EXAMPLE III

This example describes the synthesis of a fully IPN hot melt adhesive for use as a bookbinding adhesive in the production of roundable books using the basic procedure described in Example I.

| Ingredient | Weight (gms) |
|---|---|
| polypropylene glycol (MW: 2000) | 155.0 |
| 1,6-hexanediol, adipate (MW: 3000) | 66.5 |
| methylene bisphenyl diisocyanate | 44.9 |
| butyl methacrylate | 19.7 |
| methyl methacrylate | 64.3 |
| methylacryloxypropyl trimethoxysilane | 6.0 |
| Dodecyl mercaptan | 0.6 |
| 2,2-azo bis (methyl butyronitrile) | 1.5 |

The sample was prepared following the procedure of Example 1. The properties of the sample were summarized as follows:

| | |
|---|---|
| % isocyanate groups | 1.35% |
| Viscosity at room temperature | solid |
| Intrinsic viscosity in tetrahydrofuran/ethanol | 6.22 dl/g |
| Isocyanate index | 1.85 |

Books may be successfully bound and rounded using any of the hot melt adhesives described herein. Moreover, satisfactory rounding may be achieved even after the adhesive has been coated on the book block and allowed to age for extended periods of time.

It will be apparent that various changes and modifications may be made in the embodiments of the invention described above, without departing from the scope of the invention, as defined in the appended claims, and it is intended therefore, that all matter contained in the foregoing description shall be interpreted as illustrative only and not as limitative of the invention.

We claim:

1. A rounded hard cover book comprising a cased-in bookblock composed of a collected seris of signatures enclosed by means of end papers, the edges of which are coated with a solvent-free hot melt polyurethane adhesive composition which is solid at room temperature consisting essentially of:
   (a) 5 to 90% by weight of a urethane prepolymer having an isocyanate content of 0.25 to 15% and an isocyanate index greater than 1 and no more than about 2;
   (b) 10 to 95% by weight of a low molecular weight polymer of ethylenically unsaturated monomers containing no active hydrogen; said hot melt adhesive formulation being characterized, in the absence of tackifiers and/or plasticizers, by a viscosity of 3000 to 50,000 cps. at 120° C.

2. The rounded block of claim 1 wherein the collected signatures are sewn to form the bookblock.

3. The rounded book of claim 1 where the adhesive is applied to the edges of the collected signatures to form the bookblock.

4. In a process for binding rounded, hard covered books comprising the steps of: (1) printing, cutting, folding and enclosing collected signatures by means of end papers to form a bookblock; (2) passing the resultant bookblock into binding machinery; (3) applying an adhesive to the sewn or cut edges of the signatures; (4) allowing the adhesive to solidify; (5) rounding the bond signatures; (6) lining up the bound sheets; and (7) casing-in the bound book, the improvement which comprises using as the adhesives a solvent-free hot melt polyurethane adhesive composition which is solid at room temperature consisting essentially of:

(a) 5 to 90% by weight of a urethane prepolymer having an isocyanate content of 0.25 to 15% and an isocyanate index greater than 1 and no more than about 2;

(b) 10 to 95% by weight of a low molecular weight polymer of ethylenically unsaturated monomers containing no active hydrogen; said hot melt adhesive formulation being characterized, in the absence of tackifiers and/or plasticizers, by a viscosity of 3000 to 50,000 cps. at 120° C.

5. The process of claim 1 wherein the ethylenically unsaturated monomer in the hot melt adhesive is selected from the group consisting of $C_1$ to $C_{12}$ esters of acrylic and methacrylic acid, vinyl esters and ethers, fumarates, maleates, styrene, acrylonitrile, ethylene and mixtures thereof.

6. The process of claim 1 wherein the ethylenically unsaturated monomers in the hot melt adhesive are polymerized to an intrinsic viscosity of 0.1 to 0.4 cps as measured in a 9:1 mixture of tetrahydrofuran and alcohol.

7. The process of claim 1 wherein the urethane prepolymer in the hot melt adhesive is prepared from the condensation polymerization of a polyol and a polyisocyanate.

8. The process of claim 1 wherein the urethane prepolymer in the hot melt adhesive is prepared from the condensation polymerization of a diol and a diisocyanate.

9. The process of claim 7 wherein the polyol in the hot melt adhesive is selected from the group consisting of substituted or unsubstituted polyalkylene ether glycols or polyhydroxy polyalkylene ethers, polyhydroxy polyesters, the ethylene or propylene oxide adducts of polyols and the mono-substituted esters of glycerol.

10. The process of claim 1 wherein the urethane prepolymer in the hot melt adhesive is prepared from the condensation polymerization of a polyamino compound and a polyisocyanate.

11. The process of claim 10 wherein the polyamino compound in the hot melt adhesive is diamino polypropylene glycol or diamino polyethylene glycol.

12. The process of claim 1 wherein the urethane prepolymer in the hot melt adhesive is prepared from the condensation polymerization of a polymercapto compound and a polyisocyanate.

13. The process of claim 12 wherein the polymercapto compound in the hot melt adhesive is a polythioether.

14. The process adhesive of claim 1 wherein the polyisocyanate in the hot melt adhesive is selected from the group consisting of ethylene diisocyanate, ethylidene diisocyanate, propylene diisocyanate, butylene diisocyanate, hexamethylene diisocyanate, toluene diisocyanate, cyclopentylene-1,3-diisocyanate, cyclohexylene-1,4-diisocyanate, cyclohexylene-1,2-diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4,4'-diisocyanate, dichlorohexamethylene diisocyanate, furfurylidene disocyanate, 1-chlorobenzene-2,4-diisocyanate, 4,4',4''-triisocyanato-triphenylmethane, 1,3,5-triisocyanato-benzene, 2,4,6-triisocyanato-toluene and 4,4'-tdimethyldiphenylmethane-2,2',5,5-tetraisocyanate.

15. The process of claim 1 wherein the free isocyanate content of the hot melt adhesive is 0.25 to 4%.

16. The process of claim 15 wherein the free isocyanate content of the hot melt adhesive is less than 1%.

17. The process of claim 1 wherein the bookblock is an unsewn bookblock and the hot melt adhesive is applied to the cut edges thereof.

18. The process of claim 1 wherein the bookblock is a sewn bookblock and the hot melt adhesive is applied to the sewn edges thereof.

19. The rounded hard cover book produced by the process of claim 1.

* * * * *